United States Patent Office 3,325,562
Patented June 13, 1967

3,325,562
HOT MELT ADHESIVE COMPRISING POLYPROPYLENE AND AN AROMATIC HYDROCARBON-ALDEHYDE RESIN
Melvin E. Peterkin, Brookhaven, Pa., assignor to Sun Oil Company, Philadelphia, Pa., a corporation of New Jersey
No Drawing. Filed Mar. 23, 1965, Ser. No. 442,195
4 Claims. (Cl. 260—897)

This invention relates to hot melt adhesive compositions. In particular, it relates to hot melt adhesive compositions having high performance properties which are prepared from low-cost ingredients.

Hot melt adhesives produce a bond by simple cooling as distinguished from cross-linking or other chemical reactions. Prior to heating the adhesives are thermoplastic solid materials. Upon heating they melt rather sharply and flow freely, and they can be remelted after cooling. The fact that hot melts are remeltable makes it possible to apply them to a substrate at one time and to remelt them and form the adhesive bond later.

Hot melt adhesives are used for bonding wood, paper, plastics, textiles and other materials. A particular use is in the fabrication of paper cartons. Hot melts for container board must have high bond strength under conditions of shock, high humidity and temperature extremes encountered in transportation and storage encountered by paper cartons. In addition, melt point, setting time, pot life and general handling qualities on corrugators and in automatic box-making machinery are essential requirements.

I have found that the object of providing a high performance, low-cost, hot melt adhesive can be obtained by blending atactic polypropylene, isotactic polypropylene and an aromatic hydrocarbon-aldehyde (formolite) resin. The compositions of the present invention have good properties for use in bonded materials, particularly paper. The hot melt adhesives of the invention can be used to bond the corrugating medium to the top and bottom facer sheets in the making of corrugated paper board.

The atactic (essentially non-crystalline) polypropylene is formed during the stereospecific polymerization of polypropylene. The polymerization takes place in the presence of a catalyst comprising a coordination complex of a transition metal halide with an organo-metallic compound. The atactic polyproylene represents from about 5 to about 15% by weight of the polymerization product, the remainder being crystalline or isotactic polypropylene. The atactic polymer has a molecular weight of from about 15,000 to about 60,000, more particularly, from about 16,000 to 20,000. It is soluble in boiling pentane, hexane, heptane and other hydrocarbons. The atactic polypropylene suitable for the compositions of the present invention are further characterized in that they have a Brookfield viscosity of from about 4,200 cp. to about 5,800 cp. at 300° F. and a ring and ball melt point in the range of 115° to 121° C.

In one known process, the polymerization product in the heptane reaction medium is contacted with a solvent consisting of methanol and water to kill the catalyst. The catalyst is then removed in solution leaving behind a heptane slurry. The atactic polypropylene is in solution in the heptane, and this solution is removed from the isotactic polymer. The solution is distilled to recover the heptane solvent which is recycled. The material which remains is the atactic polypropylene employed in the compostions of this invention. Suitable atactic polypropylene is commercially available such as that manufactured and sold by the Avisun Corporation under the trade name, "Oletac 100."

The isotactic polypropylene employed in the compositions of the invention may be that from which the atactic was separated in the above process and is substantially crystalline having a molecular weight of from about 80,000 to about 95,000.

Aromatic hydrocarbon-aldehyde resins are well known in the art. Their preparation is described in many patents including U.S. Patent No. 1,827,538 and U.S. Patent No. 2,992,208, and in the literature, see for example Walker, Formaldehyde, 2nd edition, pages 342–345.

Typical feedstocks for the formolite reaction include aromatic hydrocarbon fractions boiling in the range of from about 200° F. to 950° F., derived from petroleum refinery streams such as cracked fractions, cycle streams, hydroformer bottoms, fuel oil, straight run distillates and pure aromatic fractions. The gas oil fraction from catalytic cracking, boiling in the range of from about 450° F. to about 650° F. and containing 15 to 50% aromatic hydrocarbons is a particularly preferred feedstock.

Suitable aldehydes are formaldehyde and materials which yield formaldehyde under the conditions of the reaction such as formalin, paraformaldehyde, trioxymethylene and trioxane. Of this group, formaldehyde and paraformaldehyde are preferred because of availability and handling ease. Other aldehydes such as acetaldehyde, propionaldehyde and butyraldeyde can be used. The aldehyde is used in amounts ranging from 1 to 30 wt. percent based on the aromatic hydrocarbons in the charge.

Many catalysts have been used for the formolite reaction including $H_2SO_4$, HF, formic acid, phosphoric acid, $BF_3$, metal chlorides and other acid acting catalysts. We prefer to use sulfuric acid or $BF_3$ in the presence of acetic acid. Acetic acid serves as a modifier for sulfuric acid and for $BF_3$. Acetic acid appears to be the source of acetate groups found in the molecular structure of the formolite resin product.

The following conditions can be used: temperature—10° to 200° C., preferably 80° C. to 150° C.; pressure—10 to 250 p.s.i.a., preferably 14 to 120 p.s.i.a.; reaction times—10 minutes to 10 hours.

Conventionl equipment is used in the preparation of the formolite resin and in blending the adhesive composition of the present invention.

The following non-limiting examples describe a preferred embodiment of the invention.

*Example I*

One formolite resin was prepared in the following manner: twelve gallons of catalytic gas oil having a boiling range of 400° F. to 650° F. and containing 43% aromatics (GEL) were placed in a 20 gallon glass-lined reactor equipped with a turbine agitator.

Next, four pounds of paraformaldehyde and two gallons of acetic acid were added and the mixture heated to 200° F. by means of a hot oil bath. In a separate reaction vessel 4.56 pounds of $BF_3$ were complexed with 0.80 gallon of acetic acid. The catalyst complex was added to the other ingredients. Temperature was maintained at about 220° F. No pressure was applied. After 15 minutes, heating was discontinued and the acid layer was drawn off. The remaining reactor contents were washed 3 times with 750 ml. $H_2O$. The water was decanted and the reactor contents transferred to vacuum distillation apparatus. The following cuts were separated; initial boiling point to 651° F.–62.8% (this is considered as unreacted feed), 652° F. to 814° F.–5.1%, 815° F. to 901° F.–10.9% and 901° F.–21.1%. The 652° F. to 814° F. fraction is a light yellow liquid resin. The 815° F. to 901° F. fraction is a soft solid resin having a ring and ball melt point of 45° C. to 50° F. These two fractions are not ordinarily used in the hot melt adhesive composition of the invention and they can be recycled to a subsequent reaction to be upgraded to hard resin.

The distillation bottoms boiling above 901° F. and having a ring and ball melt point of about 120° C. (264° F.) is the type of hard formolite resin used in the adhesive composition of the invention. Hard resins having a ring and ball melt point of 120° F. to 350° F., preferably 165° F. to 300° F., are suitable formolite components.

A hard resin prepared according to the above description was analyzed by means of standard analytical methods and was found to contain approximately 2–8 wt. percent oxygen.

*Example II*

A second formolite resin was prepared in the following manner:

226 pounds of catalytic gas oil having a boiling range of 448° F. to 572° F. and containing 47.3% aromatics (GEL) and 14 pounds of paraformaldehyde were placed in a 50 gallon glass-lined reactor equipped with an agitator. The mixture was heated to a temperature in the range of 190° F. to 230° F.

Next, 18 pounds of 96 wt. percent sulfuric acid was slowly added to 55 pounds of glacial acetic acid with stirring and the acid mixture was slowly metered to the reactor with agitation.

The reaction mixture was stirred for about 30 minutes at a temperature ranging from 190° F. to 230° F. A closed system was used and the pressure slowly rose to about 32–33 p.s.i.g.

Heating was discontinued, the acid layer was removed by settling, and the reaction products were pumped hot to water washing facilities. The products were washed four times. Water was removed by settling and the reaction product was vacuum distilled. 30.7 pounds of hard resin were recovered. This represented a bottoms fraction boiling above about 500° F. at 1 mm. The material had a ring and ball melt point of 105° C. (220° F.). This resin and others prepared as shown in Examples I and II were analyzed for acetate content and were found to contain from about .1 to about 1.0 acetate groups per molecule of formolite resin. Analysis was obtained by saponification number and infrared spectra.

The hot melt adhesive is made by thoroughly mixing the ingredients at a temperature in the range of 200° F. to 400° F. and preferably 300° F. to 350° F.

For application to a surface, the adhesive is heated to a temperature in the range of 250° F. to 300° F., then applied to the surfaces which are to be joined in any suitable manner.

The first is the tear seal test. The sample is made on 50 pound kraft paper cut into 1 by 6 inch strips. One strip is coated on a single side for a length of two inches with a 1 to 2 mil coating of hot adhesive and another strip is placed over the first strip. The sample then consists of two layers of paper bonded together on internal surfaces over a two square inch area at one end. The test is made by gripping the free ends of the strips and pulling slowly in opposite directions perpendicular to the bond. A tear seal is indicated when the adhesive bond produces failure in the substrate (in this case kraft paper) at room temperature and at −25° F. The latter temperature is used to test for brittleness at the most severe low temperature service conditions the bond might be expected to encounter.

The second is the delamination test. This test is made by forming a 2 inch lap joint with two 1 by 6 inch 50 pound kraft paper strips. The sample is joined by a square inch area of adhesive having thickness of 1 to 2 mils. The total length of the sample is 10 inches. The strip is suspended in a 150° F. oven for one-half hour. There should be no indication of the paper substrates parting in order to pass the test.

A third test, the creep test, is made on samples that pass the initial screen of the first two tests. This test is made by forming a 2 inch lap joint with two 1 by 6 inch 50 pound kraft paper strips. The sample is joined by a two square inch area of adhesive having thickness of 1 to 2 mils. The total length of the sample is 10 inches. The strip is suspended for one-half hour in an oven at the desired temperature with a 100 gram weight attached to the bottom of the lower strip. This test is designed to determine the susceptibility of the adhesive bond to deformation as a function of temperature. Stability of the bond up to 75° C. or greater is considered adequate.

*Example III*

The following runs show the characteristics of the various atactic polypropylene, isotactic polypropylene, and formolite resin compositions:

Properties of "Oletac 100" employed are employed are as follows:

TABLE I

| | |
|---|---|
| Viscosity at 300° F., cp. | 4,200 to 5,800 |
| Ring and Ball, ° C. | 115 to 121 |
| Molecular Weight | 16,000 to 20,000 |
| Intrinsic Viscosity [n] | .28 |

TABLE II.—ATACTIC-ISOTACTIC BLENDS CONTAINING FORMOLITE HARD RESIN

| Run | Parts By Weight | | | Ring and Ball, ° C. | Viscosity at 300° F., cp. | Failure Creep, ° C. | Tear Seal | |
|---|---|---|---|---|---|---|---|---|
| | Atactic (Oletac 100) | Isotactic | Formolite | | | | R.T. | −25° F. |
| 1 | *90 | 10 | 0 | 158 | 30,000 | >120 | Q | T |
| 2 | *90 | 10 | 2 | 156 | 28,000 | >120 | N | T |
| 3 | *90 | 10 | 4 | 156 | 24,000 | >120 | T | T |
| 4 | *90 | 10 | 5 | 157 | 28,000 | >130 | T | N |
| 5 | *90 | 10 | 10 | 155 | 20,000 | >130 | T | N |
| 6 | *90 | 10 | 20 | 155 | 30,000 | >130 | Q | N |
| 7 | *90 | 0 | 10 | 118 | 5,300 | 120 | Q | N |
| 8 | *90 | 0 | 20 | 117 | 4,900 | 120 | Q | N |

*One part antioxidant added in compounding adhesive.
T—Tear Seal.
Q—Questionable tear seal (tear seal when strips pulled apart at moderate speed—no tear seal when pulled apart slowly.
N—No tear seal.

Suitable relative amounts of ingredients are from about 70 to 95 wt. percent atactic polypropylene, from about 1 to 15 wt. percent isotactic polypropylene and from about 1 to 20 wt. percent of the formolite resin. The preferred ranges of relative amounts of ingredients are from 75 to 89 wt. percent atactic polypropylene, from 9 to 11 wt. percent isotactic polypropylene and from 1 to 16 wt. percent of the formolite resin.

The hot melt adhesives can be screened by two simple tests with kraft paper.

Compositions for which there is no tear seal or a questionable tear seal at room temperature and a tear seal at −25° F. would be suitable for instance on packages of frozen food where a tear seal is desirable at low temperatures but for easy opening a weak tear seal is desirable at room temperature. Compositions that exhibit tear seals at room temperatures but not at −25° F. would be employed in uses where it would be desirable that the seals would be easily opened at low temperatures such as, for instance, ice cream containers.

The composition having questionable or no tear seal at room temperature or −25° F. do have high shear strength at these temperatures.

The adhesive compositions of the present invention can contain functional materials such as plasticizers, tackifiers, fillers, solvents, thinners, antioxidants and coloring agents.

The invention claimed is:

1. A thermoplastic hot melt adhesive composition comprising a homogeneous mixture of from about 70 to about 90 wt. percent of atactic polypropylene having a molecular weight of 15,000 to 60,000, from about 1 to about 15 wt. percent of isotactic polypropylene having a molecular weight of 80,000 to 95,000 and from about 1 to 20 wt. percent of an aromatic hydrocarbon aldehyde resin having a ring and ball melt point in the range of from about 120 to about 350° F.

2. A thermoplastic hot melt adhesive composition comprising a homogeneous mixture of from 75 to 89 wt. percent of atactic polypropylene having a molecular weight of 15,000 to 60,000, from 9 to 11 wt. percent of isotactic polypropylene having a molecular weight of 80,000 to 95,000 and from 1 to 16 wt. percent of an aromatic hydrocarbon aldehyde resin having a ring and ball melt point in the range of from about 120 to about 350° F.

3. A thermoplastic hot melt adhesive composition comprising a homogeneous mixture of from about 75 to 89 wt. percent of atactic polypropylene having a molecular weight of 16,000 to 20,000, from about 9 to 11 wt. percent of isotactic polypropylene having a molecular weight of 80,000 to 95,000 and from about 1 to 16 wt. percent of an aromatic hydrocarbon-aldehyde resin having a ring and ball melt point in the range of from about 165 to about 300° F.

4. A thermoplastic hot melt adhesive composition comprising a homogeneous mixture of about 90 parts by weight of atactic polypropylene having a molecular weight of 16,000 to 20,000, about 10 parts by weight of isotactic polypropylene having a molecular weight of 80,000 to 95,000 and about 4 parts by weight of an aromatic hydrocarbon-aldehyde resin having a ring and ball melt point in the range of from about 165 to about 300° F., said adhesive showing good adhesive bonds with kraft paper to kraft paper in a wide range of temperatures.

References Cited

UNITED STATES PATENTS

| | | | |
|---|---|---|---|
| 3,167,530 | 1/1965 | Goodrich | 260—67 |
| 3,208,974 | 9/1965 | Roberts | 260—67 |
| 3,216,926 | 11/1965 | Kurtz et al. | 260—67 |
| 3,220,966 | 11/1965 | Flanagan | 260—897 |
| 3,262,996 | 7/1966 | Kurtz et al. | 260—887 |

MURRAY TILLMAN, *Primary Examiner.*

T. G. FIELD, Jr., *Assistant Examiner.*